United States Patent [19]
Herger et al.

[11] Patent Number: 5,900,015
[45] Date of Patent: May 4, 1999

[54] SYSTEM AND METHOD FOR MAINTAINING CACHE COHERENCY USING PATH DIRECTORIES

[75] Inventors: Lorraine Maria Paola Herger, Kingston, Pa.; Kwok-Ken Mak, Wappingers Falls, N.Y.; Kenneth Blair Ocheltree, Ossining, N.Y.; Tu-Chih Tsai, Yorktown Heights, N.Y.; Michael Edward Wazlowski, Carmel, N.Y.

[73] Assignee: International Business Machines Corporation, Armonk, N.Y.

[21] Appl. No.: 08/694,894

[22] Filed: Aug. 9, 1996

[51] Int. Cl.[6] .................................................. G06F 13/00
[52] U.S. Cl. ........................................... 711/141; 711/145
[58] Field of Search ..................................... 711/141, 118, 711/119, 120, 121, 130, 145, 124, 147

[56] References Cited

U.S. PATENT DOCUMENTS

| | | | |
|---|---|---|---|
| 4,755,930 | 7/1988 | Wilson, Jr. et al. | 711/122 |
| 5,018,063 | 5/1991 | Liu | 711/141 |
| 5,197,139 | 3/1993 | Emma et al. | 711/141 |
| 5,297,269 | 3/1994 | Donaldson et al. | 711/145 |
| 5,313,609 | 5/1994 | Baylor et al. | 711/121 |

FOREIGN PATENT DOCUMENTS

| | | |
|---|---|---|
| 0049387 | 4/1982 | European Pat. Off. . |
| 0489583 | 6/1992 | European Pat. Off. . |
| 0764905 | 3/1997 | European Pat. Off. . |

OTHER PUBLICATIONS

R. Omran et al., "An Efficient Single Copy Cache coherence Protocol for Multiprocessors with Multistage Interconnection Networks", In Proceedings of the 1994 Conference for Scalable High Performance Computing, pp. 1–8, May 1994.

R. Omran et al., "A Multi–cache Coherence Scheme for Shuffle–Exchange Network based Multiprocessors", pp. 72–79, IEEE Computer Soc. Press, Sep. 1995.

D. Chaiken et al., "Directory–Based Cache Coherence in Large–Scale Microprocessors", Computer Magazine, Jun. 1990, pp. 49–58.

D. Lenoski et al., "DASH Prototype: Logic Overhead and Performance", IEEE Transactions on Parallel and Distributed Systems, vol. 4, No. 1, Jan. 1993, pp. 41–61.

H. Mizrahi et al., "Extending the Memory Hierarchy into Multi–Interconnection networks: A Performance Analysis", 1989 International Conference on Parallel Processing, pp. I–41 to I–50.

*Primary Examiner*—Glenn Gossage
*Attorney, Agent, or Firm*—Kevin M. Jordan; David M. Shofi

[57] ABSTRACT

A method of maintaining cache coherency in a computer system including two or more processors sharing information, the processors coupled by two or more interconnects to a memory such that the processors are not directly coupled to the same is disclosed interconnect is disclosed. The method of maintaining cache coherency includes the steps of: accessing and sharing, by a first processor and a second processor, information from the memory and setting path indicators in directories associated with at least two of the interconnects on a respective first and second access path to the memory, and storing the information in respective associated first and second caches; and writing a new value to the information, by a writing processor sharing the information, the writing step including the steps of: invalidating other copies of the information via the path indicators; acquiring exclusive access to the information by changing the path indicators to an exclusive state; and writing the new value to the information, in response to the acquiring step.

22 Claims, 8 Drawing Sheets

SYSTEM AND METHOD FOR MAINTAINING CACHE COHERENCY USING PATH DIRECTORIES

FIELD OF THE INVENTION

The present invention is related to data processing in a multiprocessing system wherein each processor has an associated cache. More specifically, the present invention is related to a scalable cache coherency method and system for use in a multiprocessing system coupled by a plurality of interconnects to a memory such that the processors are not directly coupled to the same interconnect.

BACKGROUND

In general, prior art cache coherency protocols can be divided into shared resource methods and directory 1 based protocols. In shared resource methods, coherency is maintained by ensuring that all address operations are visible to caches in the entire system. This is accomplished by using shared address buses and requiring inclusion in the lower level caches that attach to the shared address buses. The other approach is to maintain either global or distributed directories of the location of information throughout the system.

Traditional shared memory multiprocessing systems have been designed with a single shared address bus for all memory coherent requesters. The drawback of this approach is that the system throughput is limited by this single address bus. Other shared memory multiprocessor systems use a single switching unit, with similar limitations on address bandwidth.

U.S. Pat. No. 4,755,930 issued to Wilson, Jr. et. al., ("Wilson") discloses a method for hierarchical cache memory coherency, but requires that a cache write-through be used, i.e., every cache write operation updates the corresponding location in central memory. Wilson maintains coherency through requiring cache inclusion and requiring write-through of all cache writes to central memory. Requiring cache inclusion uses cache space inefficiently, and using write-through uses interconnection bandwidth inefficiently. Thus, a need exists for a coherency method that does not require inclusion or write-through. The present invention addresses such a need.

A review of directory-based approaches to cache coherency can be found in "Directory-Based Cache Coherence in Large-Scale Multiprocessors", by Chaiken, D.; Fields, C.; Kurihara, K.; and Agarwal, A., Computer Magazine, June 1990, pp. 49–58. These prior art directory schemes are classified into three categories: full-map directories, limited directories, and chained directories. A full map directory exists when one bit is present for every processor to identify if a cache line is held by that processor. A limited directory allows a limited number of processors to hold a given cache line. A Chained directory uses a linked list of the processors that hold a given cache line. A need exists for a method that does not require a directory entry for every processor, does not limit the number of cached copies, and does not have the latency or complexity associated with a linked list system. The present invention addresses such a need.

U.S. Pat. No. 5,297,269 issued to Donaldson et. al., discloses a multiprocessor cache coherency protocol that uses a global full-map directory scheme in central memory. All memory accesses would perform lookups in the single directory. One concern with such a single-directory system is that it may create a system bottleneck. A method without the limitation of a single directory is desired. The present invention addresses such a need.

U.S. Pat. No. 5,313,609 issued to Baylor et. al., discloses a coherency method that uses a global directory. This method has the same limitation as the Donaldson patent, in having limited access to the single directory. The single global directory also prevents scaling of the system, since the directory size and the access traffic to the directory would have to increase for a larger system. A method without a global directory is desired. The present invention addresses such a need.

The use of distributed directories avoids some of the limitations associated with a global directory. An example of the full-map distributed directory approach is described by D. Lenoski, J. Laudon, T. Joe, D. Nakahira, L. Stevens, A. Gupta, and J. Hennessy, in "The DASH Prototype: Logic Overhead and Performance," IEEE Transactions on Parallel and Distributed Systems, Vol.4, No. 1, January 1993, pp. 41–61 ("Lenoski"). Lenoski's system maintains a full-directory for all the processors, with one directory bit per cache line for every processor in the system. Thus, in this DASH system, every directory has a number of bit entries equal to the number of cache lines times the number of processors in the system. Thus a need exists for a cache coherency directory that uses a smaller directory size and does not require an entry for every processor in the system for every directory. The present invention addresses such a need.

A distributed directory system wherein the directories are distributed and associated with hierarchical switch elements that also contain caches is disclosed by H. Mizrahi, E. Baer, and J. Zahorjan, in "Extending the Memory Hierarchy into Multiprocessor Interconnection Networks: A Performance Analysis," 1989 International Conference on Parallel Processing, pp. I-41–I-50 ("Mizrahi"). Mizrahi's system arranges the caches in a tree structure and connects them to a global memory. The directories in Mizrahi's system record the switch port that provides a path to the desired cached copy. The limitation of the Mizrahi system is that only one single copy of each memory location is allowed to be present in the system at a time. Thus, Mizrahi completely avoids the difficulty of coherency enforcement. While the scheme of Mizrahi is simple in implementation, it may suffer performance problems where read information needs to be shared. A method is needed that overcomes this limitation of a single copy of each memory location. The present invention addresses such a need.

Omran and Aboelaze build on the work of Mizrahi and describe a multistage switch network with caching and directories in the switches ("Omran"). See R. Omran, and M. Aboelaze, "An Efficient Single Copy Cache Coherence Protocol for Multiprocessors with Multistage Interconnection Networks" in Proceedings of the 1994 Conference for Scalable High Performance Computing, pp. 1–8, May 1994. Omran also relies on a single copy requirement to prevent cache coherency problems. Cache inclusion is not required in the different level caches since only one copy is allowed in the system. Thus, a need still exists for a cache coherency protocol without a global directory that allows multiple copies in a switch-based network, but does not require a full directory of all processors in each switch directory. The present invention addresses such a need.

A brief survey of the state of the art of coherence methods for multistage interconnection networks is also discussed by Omran and Lee. See R. Omran, and D. Lee, "A Multi-cache Coherence Scheme for Shuffle-Exchange Network based Multiprocessors," Proceedings of the Fifth Symposium on the Frontiers of Massively Parallel Computation, February 1995 ("Omran and Lee"). The techniques described include the full-map, which provides a bit for each cache in the system, and which is not scalable. Omran and Lee conclude that when directory schemes are used in multistage interconnection networks, immense coherence traffic is generated, causing more contention and latency problems. Omran and Lee then propose a Shuffle Network topology allowing only a single copy. A solution is desired which does not have a single copy limitation and does not have the large amounts of coherence traffic that would typically be expected with such a system. The present invention addresses such a need.

SUMMARY

In accordance with the aforementioned needs, the present invention is directed to a cache coherency method for use in a large multiprocessing system. A system having features of the present invention includes a hierarchical tree of interconnects, where at least two interconnects have a cache coherency directory with a routing record for each line of storage in the system memory. Each routing record has an entry for each port to indicate if a copy of the line is being held by a processor that is reached through the port. Typically, there are multiple (N) Local ports that connect either to processors or to other interconnects, and one Global port that is connected to the Local port of another interconnect. Thus, there is typically one interconnect at the bottom level, N interconnects at the next level, and $N^2$ interconnects at the next level. The processors are typically connected to the highest level of interconnects, and if M processors can be connected to a bus connected to the port of an interconnect at the highest level, then for L levels, up to $M*N**L$ processors can be interconnected. Caches would also be typically associated with the interconnects to lessen traffic out of the Global ports.

A method for sharing information among caches having features of the present invention includes indicating the location of the copy in the directories in the switches on the path between system memory and the caches involved in sharing. When a cache acquires an exclusive copy, it uses the path information stored in the directories to invalidate all of the other cached copies so that it can write to an exclusive copy. These features advantageously limit cross-invalidate traffic to the regions of the shared memory multiprocessing system involved, and also provide scalability to large shared memory multiprocessing systems. Additionally, the same interconnect building block can be used for all the different interconnect levels, minimizing the number of chips that need to be designed to build the system.

BRIEF DESCRIPTION OF THE DRAWINGS

For additional features and advantages of the present invention, refer to the detailed description and accompanying drawing wherein.

DETAILED DESCRIPTION

Figure 1:
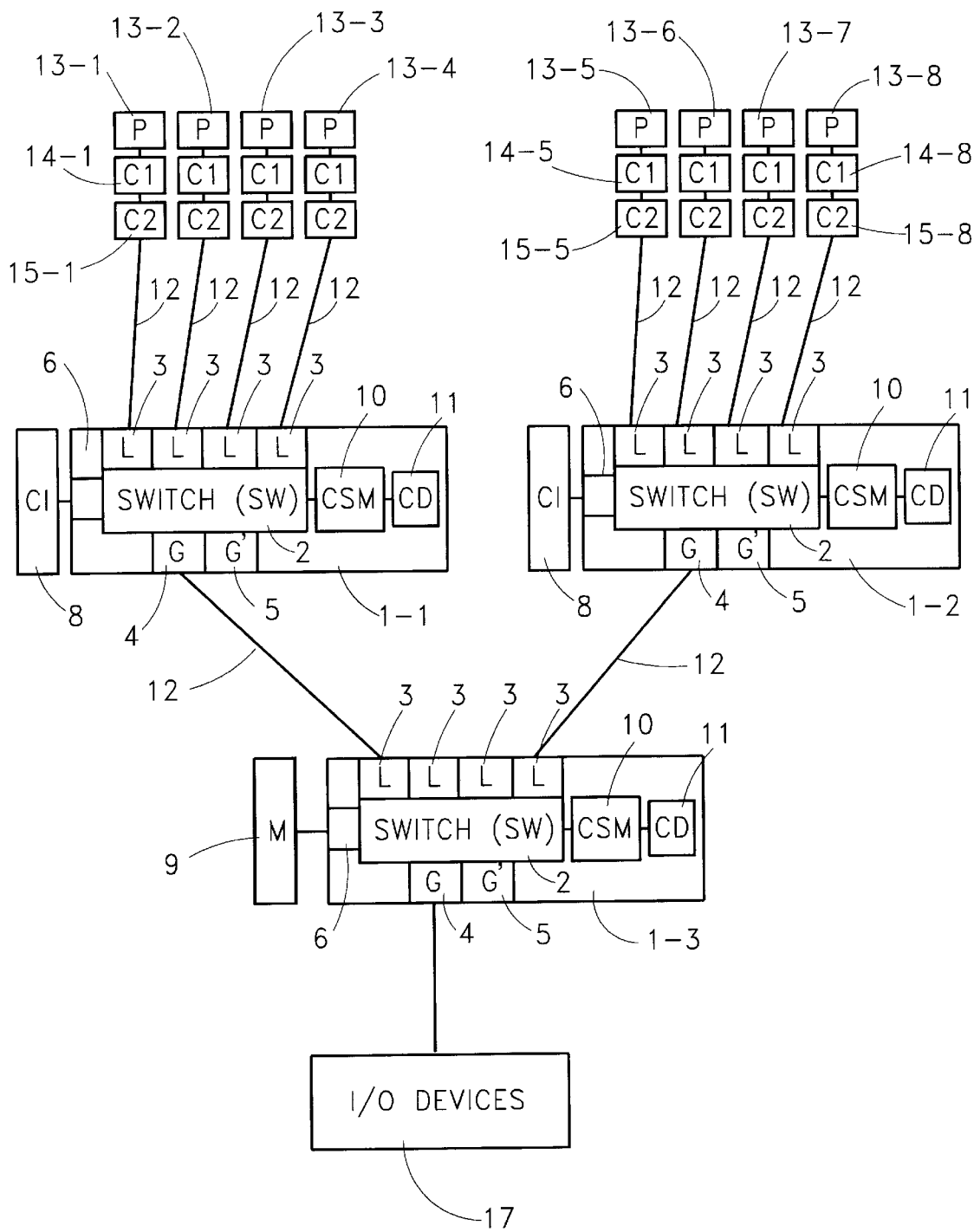
FIG. 1 shows embodiment of a system according to the present invention.

The present invention is directed to a system and method for maintaining cache coherency in a shared memory multiprocessor system with multiple interconnects. FIG. 1 shows a block diagram of a system according to the present invention. As depicted, the system includes multiple processors (labelled "P") 13-1 to 13-8 connected through multiple interconnects 1-1 to 1-3 to a memory 9. The present invention is scalable to a large number of processors because it uses a distributed directory coherency scheme which does not require separate entries for each processor associated cache.

According to the present invention, individual coherency directories (labelled "CD") 11 are associated with the different interconnects in the system. An interconnect may use a switch, a bus, a ring, or any other means for routing traffic between two or more external interconnect ports 3, 4 and 5. Each coherency directory 11 is a full map of memory 9, tracked on a memory segment or cache line basis, with one entry for each interconnect port. For purposes of description, the memory segment or cache line is generically referred to, hereinbelow, as an information unit. Each coherency directory 11 provides a local view of memory 9; corporately the coherency directories provide a global view of memory. According to the present invention, coherency, operations can be advantageously directed to only affected ports without disturbing the flow of operations on unaffected ports. This limits cross-invalidate traffic to the regions of the shared memory multiprocessing systems that are involved. Thus, scalability to large shared memory multiprocessing systems is achieved. Additionally, the same interconnect building block can be used for all the different interconnect levels, e.g. 1-1, 1-2, and 1-3 may be the same component, differing only in attached memory, which may vary in role, (as cache or main memory), and in size.

Each interconnect of the present invention performs the functions of routing traffic between attached ports, caching frequently accessed information and maintaining the coherency directory 11, giving the local perspective of the location of cached copies in the system. The full set of interconnects within a system is called the interconnect network. For example, interconnects 1-1 to 1-3 make up the interconnect network. As is conventional, traffic routed by the interconnect network includes data and instructions for the processors and processor caches, I/O operations, and coherency transactions that are used to maintain a single image of memory across the set of processors. Data and instructions for the processors are moved across the interconnect network using memory transactions, such as a read or a write, that travel between processors, processor caches, interconnect caches and memory. A read request originating at a processor traverses the interconnect network, using the directories within the interconnects to obtain the status of and to locate the requested information.

Figure 2:
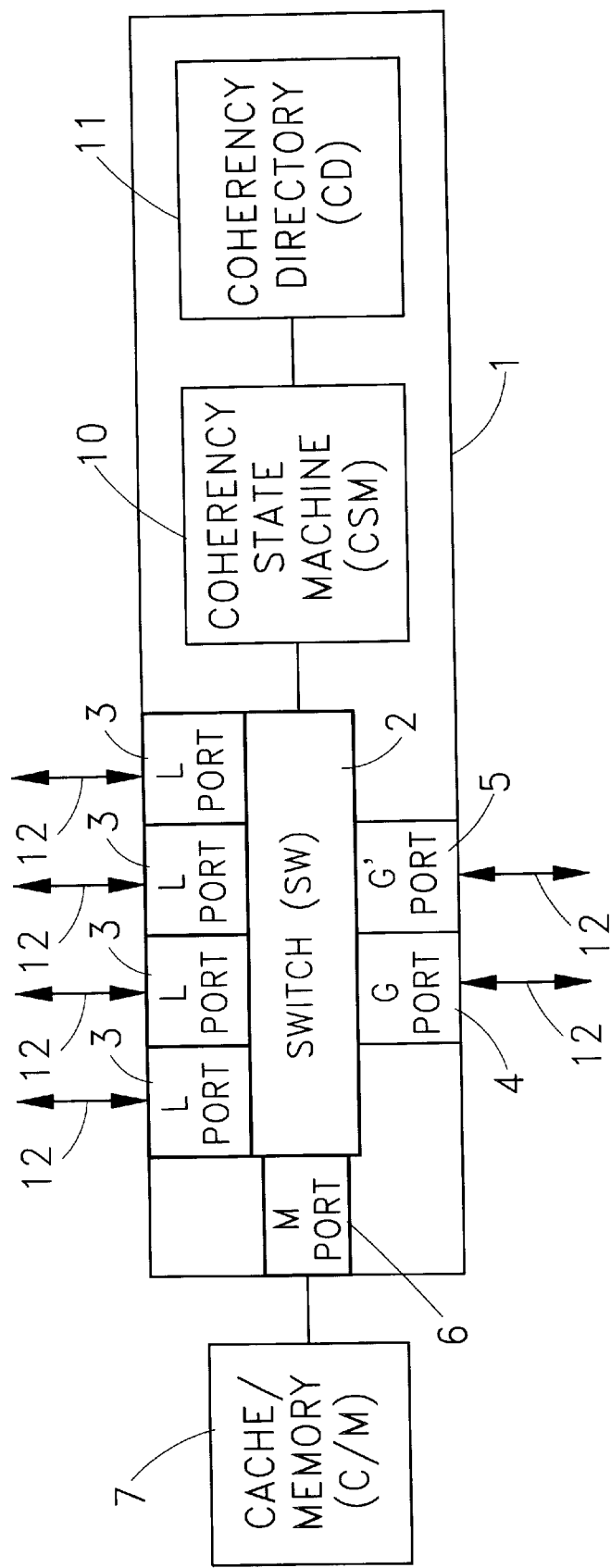
FIG. 2 shows an embodiment of the interconnect of FIG. 1.

In FIG. 2, the interconnect 1 according to an embodiment of the present invention includes: an interconnect switch 2, (a bus or other means for routing can be substituted); external ports 3, 4, and 5; a memory port 6; a coherency state machine 10; a coherency directory 11; and an optional cache or memory 7. The interconnect switch 2 is capable of routing traffic between the external ports 3, 4, and 5 and the memory port 6. The coherency state machine 10 (described hereinbelow with reference to FIG. 3) preserves coherency across the system by maintaining the coherency directory 11 and propagating coherency operations. The coherency directory 11 is used for maintaining a local perspective of the location of cached copies in the system.

The ports of the interconnect 1 can be divided into local (labelled "L") ports 3, global (labelled "G"and "G") ports 4 and 5, and a memory port 6. As shown in FIG. 1, the memory port 6 can be used for attaching either an optional interconnect cache (labelled "C1") 8 or memory (labelled "M") 9. An optional cache can be used for maintaining a copy of frequently used information at the interconnect level, so that access latency is minimized. Local ports 3 can be used to create larger topologies, either by attaching processor modules (processor and/or cache) or by attaching other interconnects. Global ports 4 and 5 are used to connect the interconnect 1 to the rest of a tree, or to attach I/O devices 17 to a root interconnect e.g., 1-3. Typically, when a memory request (e.g., to read and write) is received by an interconnect and the location of information is not known locally, the request is sent out of the global port, making the request known to a larger portion of the topology. Thus, the global port is the default routing port of each interconnect.

As is conventional, additional global ports may be present on an interconnect, with the additional ports designated as alternate global ports. An alternate global port (labelled "G") 5 is shown in FIG. 1 and FIG. 2. The alternate global port 5 allows redundancy to be built in the tree for fault tolerance. More than one alternate global port 5 may be present in an interconnect 1. Traffic may either be routed only through the primary global global port 4 or one of the alternate ports at a time, or traffic may be divided among the full set of global ports.

Figure 4:
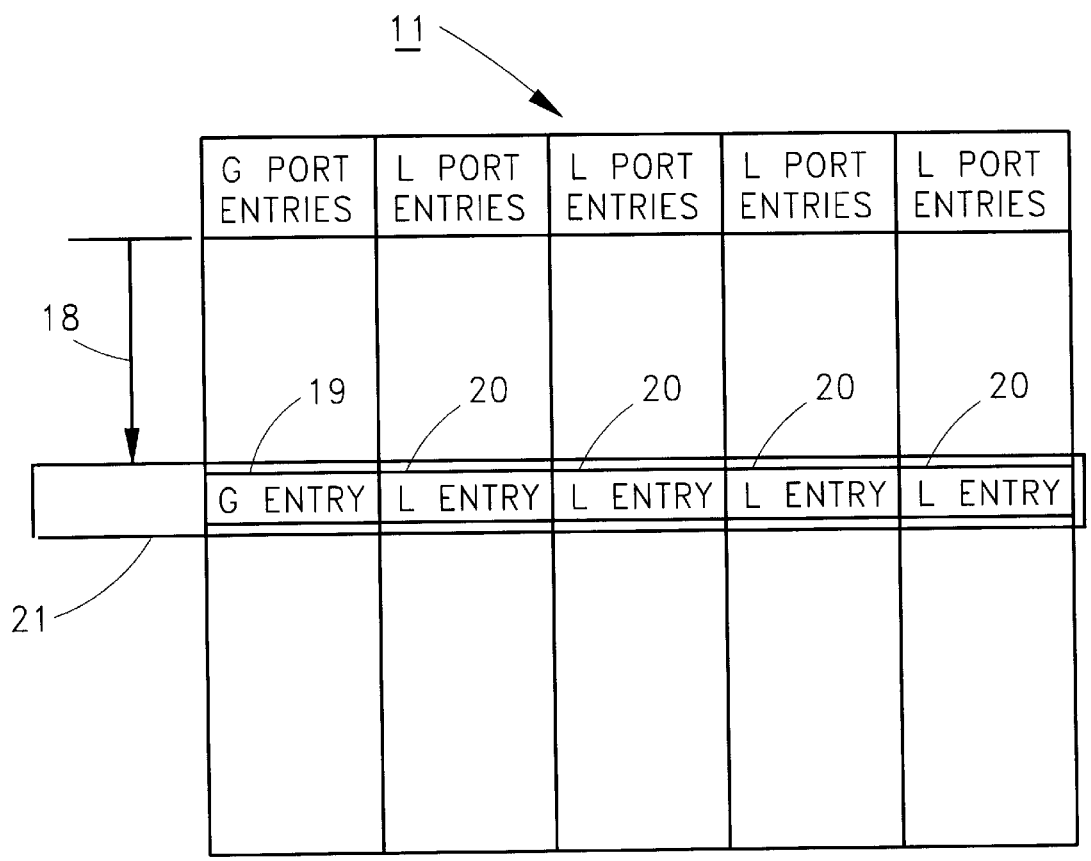
FIG. 4 shows an embodiment of the structure of the coherency directory of FIG. 1.

FIG. 4 depicts an example of a coherency directory 11 of the present invention. The coherency directory 11 is managed by the coherency state machine 10 to maintain a local perspective of the location of the cached information in the system. For each information unit, located at an associated offset 18 in memory 9, the coherency directory 11 has a coherency record 21, with associated entries 19 and 20 for each external port of the interconnect. An entry is present for each local port 3, designated as an L entry 20, and one entry is present for the global port 4, designated as the G entry 19. Additional entries may be present for the alternate global ports 5. Typically, each entry is a single bit. A set entry indicates that the information unit is being used by a processor or device that can be reached through the associated port. If multiple entries are set for a single information unit, then that information unit is being cached in multiple locations.

The coherency directories 11 are used to indicate the path that is followed in transfer and coherency operations as information units are transferred between caches and memory. The entries of the coherency directory 11 individually indicate path information and collectively represent states of a coherency state machine 10. An instance of the coherency state machine 10 is managed for each information unit of the memory. The entries of the coherency directories 11 operate according to the state transition diagram shown in FIG. 3. Information units are kept coherent among the caches throughout the system by noting the path followed by responses to read operations and using coherency operations to propagate other coherency information across the interconnection links 12, as shown in FIG. 1.

Figure 3:
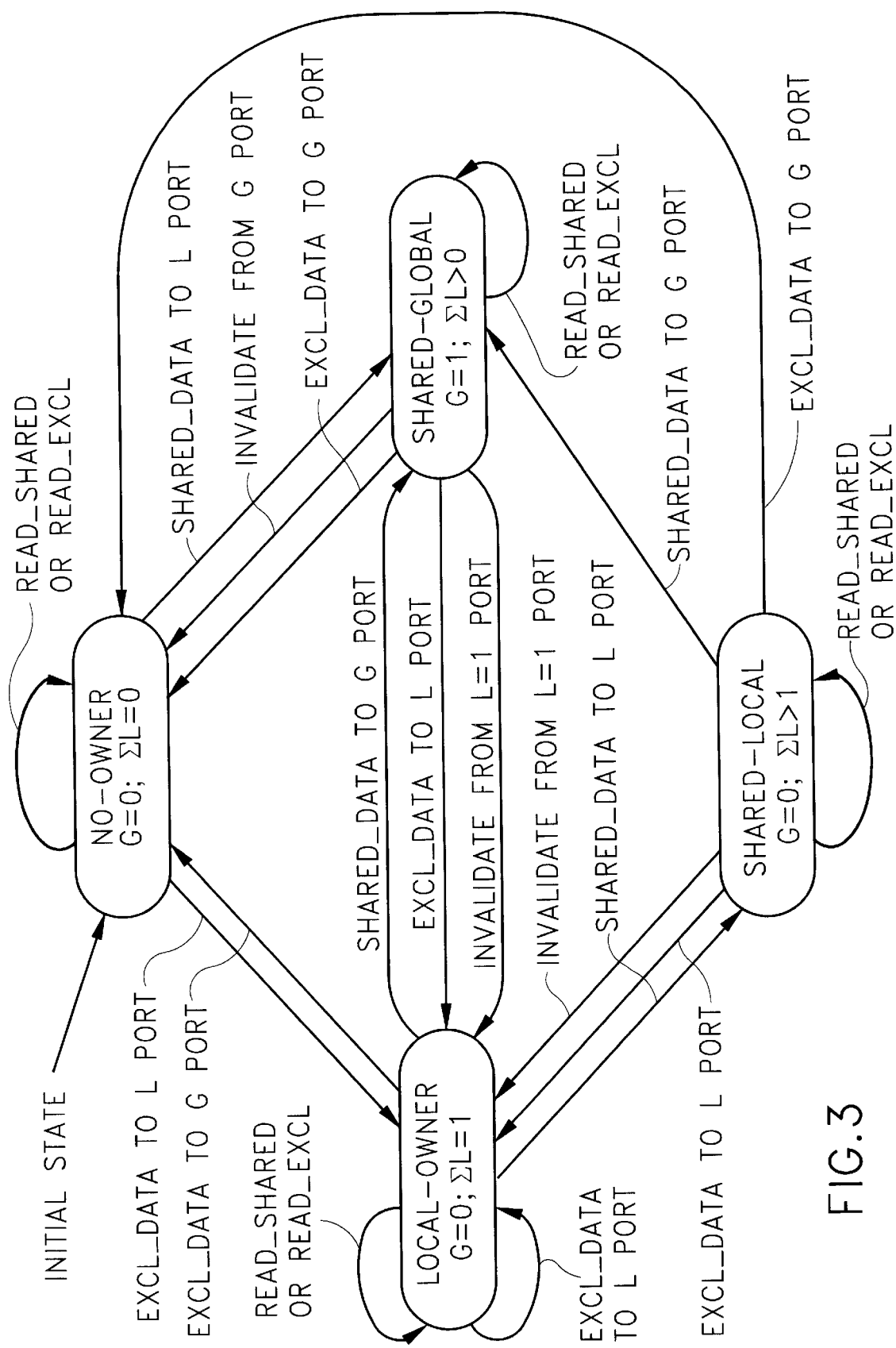
FIG. 3 shows an embodiment of the coherency state machine of FIG. 1.

Operations and the coherency state machine transitions that they cause are shown in FIG. 3. By way of overview, read operations may either be a request to share an information unit (Read_Shared), which receives a Shared_Data response operation , or a request for exclusive reading of an information unit (Read_Excl), which receives an Excl_Data response operation. The state of the coherency state machine 10 is not changed on read requests operations, but changes on the responses operations to the reads. The invalidate operation (Invalidate) is propagated to invalidate other cached copies of an information unit when a processor is attempting to gain exclusive ownership of that information unit. An invalidate acknowledgement (Invalidate_Ack) operation is required in response to an Invalidate operation to indicate that the operation was accepted and completed. The Shared_Data, Excl_Data, and Invalidate operations, cause transitions in the associated coherency state machines 10, with the specific state machine transitions determining which coherency operations are propagated.

The coherency record 21 (FIG. 4) associated with each information unit provides state information for the coherency state machine 10, and all different combinations of entry values can be represented by four basic coherency states as shown in FIG. 3: NO-OWNER state, LOCAL-OWNER state, SHARED-LOCAL, and SHARED-GLOBAL state. From these four states, global coherency can be maintained throughout the cache or memory hierarchy.

The relationship of the different states and the state transitions of the coherency state machine 10 are shown in FIG. 3. In the state machine discussion, the presence of an information unit in an optional interconnect cache 8 will not be explicitly described, since the interconnect caches 8 maintain their own coherency by keeping their own directory and snooping traffic from the interconnect switch 2 (FIGS. 1 and 2).

In the NO-OWNER state, the coherency directory 11 has no knowledge of a cached copy of the information unit. The NO-OWNER state is the initial state, existing after a system cold atart. The NO-OWNER state exists when all L entries 20 and the G entry 19 (FIG. 4) are not set.

In the LOCAL-OWNER state, all copeis of the information unit that exist in caches can be reached through a single local port. In the LOCAL-OWNER state, the total number of L entries 20 set is equal to 1 and the G entry 19 is not set. The LOCAL-OWNER state may indicate any of the following situations: a) unshared information existing in a single cache reachable through the L port, b) shared information existing in caches reachable through the L port, or c) modified information reachable through the L port.

In the SHARED-LOCAL state, all copies of the information unit that exist in caches can be reached through local ports of the interconnect, with more than one local port required to reach all of the different copies. The SHARED-LOCAL state is represented by multiple L entries 20 being set and the G entry 19 not set. The SHARED-LOCAL state indicates that the information is shared by a set of caches reachable through the L ports with associated L entries being set.

In the SHARED-GLOBAL state, one or more copies of the information unit are reachable through local ports, while one or more copies are reachable through the global port. In the SHARED-GLOBAL state, one or more L entries 20 is set and the G entry 19 is set.

A method in accordance with the present invention is described in conjunction with the system of FIG. 1. If an information unit has not been accessed by any processor 13-1 . . . 13-8 in the system, it exists in the NO-OWNER state, in all the coherency directories 11 in the interconnects 1-1, 1-2 and 1-3 in the system. When a first processor 13-1 performs an initial read request on an information unit, the read request travels from the processor 13-1 through the intervening interconnects 1-1 and 1-3 to the memory 9. The memory line is returned to the processor 13-1 and associated caches 14-1 and 15-1 (labelled "C1"and C2) as exclusive data, using the Excl_Data operation. When the Excl_Data operation leaves the L ports on the return path in interconnects 1-3 and 1-1, the directory state in interconnects 1-3 and 1-1 transitions to the LOCAL-OWNER state. This causes the L entries to be set in the intervening interconnects 1-3 and 1-1 on the ports where the information exits. The state of the information unit remains at the NO-OWNER state in interconnect 1-2, since it is not informed of the location of the information.

If a second processor 13-8 requests to read and share the same information using the Read_Shared operation, the Read_Shared request travels from the requesting processor 13-8 through interconnect 1-2 to interconnect 1-3, which has the information unit in the LOCAL-OWNER state. When interconnect 1-3 is in the LOCAL-OWNER state and receives a Read_Shared request on the rightmost L port for information that is held by only one port, it forwards the Read_Shared request to the leftmost L port, which currently owns the information in an exclusive state and remains in the same state. This Read_Shared request then travels through interconnect 1-1 to caches 14-1 and 15-1, associated with processor 13-1, where the Read_Shared request can be satisfied. The information held by the caches may either be Modified or Clean. In either case, the information is marked as shared in the local caches and returned along the path to the second processor 13-8 using the Shared_Data operation. As the Shared_Data operation exits interconnect 1-1 on the G port, the state in interconnect 1-1 changes to the SHARED-GLOBAL state, to recognize that the information will be shared with caches that are reached through the G port. In interconnect 1-3, the Shared_Data operation travels from the leftmost L port to the rightmost L port, causing its state to transition to the SHARED-LOCAL state. Interconnect 1-2 receives the Shared_Data operation on its G port and sends it to the rightmost L port, causing it to transition from the NO-OWNER to the SHARED-GLOBAL state. The information is now shared by caches associated with processors 13-1 and 13-8, with interconnects 1-1, 1-2, and 1-3 indicating the sharing of the information.

A processor performing a write operation, illustrated here as another processor 13-5, but which could have been the first 13-1 or second processor 13-8, first requests exclusive access to the information and then performs the write operation. The following describes the process of gaining exclusive access. A read exclusive (Read$_{13}$ Excl) operation is issued by the processor 13-5 to request exclusive information access. The Read_Excl operation causes interconnect 1-2 to begin the process of invalidating other copies of the information, and to return the information if it is caching it or to send the read operation on a path that contains the information. Since the information is in the SHARED-GLOBAL state, copies of the information reside elsewhere in the system, and the Invalidate operation is propagated out the G port of interconnect 1-2 and out the rightmost L port.

When interconnect 1-3 receives the Invalidate operation, it issues an Invalidate_Ack on the port where it received the operation and sends out the Invalidate operation on the other L ports that contain the information, in this case the leftmost local port. Since interconnect 1-3 is the common interconnect for all of the caches that contain this information, interconnect 1-3 can confirm Invalidates early, by preserving ordering and atomicity of Invalidate requests. Upon completion of sending the Invalidate commands, interconnect 1-3 presents the Excl_Data on the rightmost L port, connected to interconnect 1-2. Upon sending the Excl_Data on the rightmost L port, interconnect 1-3 transitions from the SHARED-GLOBAL to the LOCAL-OWNER state. Interconnect 1-2 passes the Excl_Data to processor 13-5 and its associated caches 14-5 and 15-5 and transitions to the LOCAL-OWNER state upon passing the operation. Interconnect 1-1 receives the Invalidate operation, passes the Invalidate operation on its ports with the L entry set to one, and transitions to the NO-OWNER state.

The receipt of the Invalidate_Ack operation by processor 13-5 indicates that the processor now has the information in the exclusive state and can write to the information unit. The process of gaining exclusive access to the information unit is then completed when the Invalidates have completed their propagation.

Figure 5:
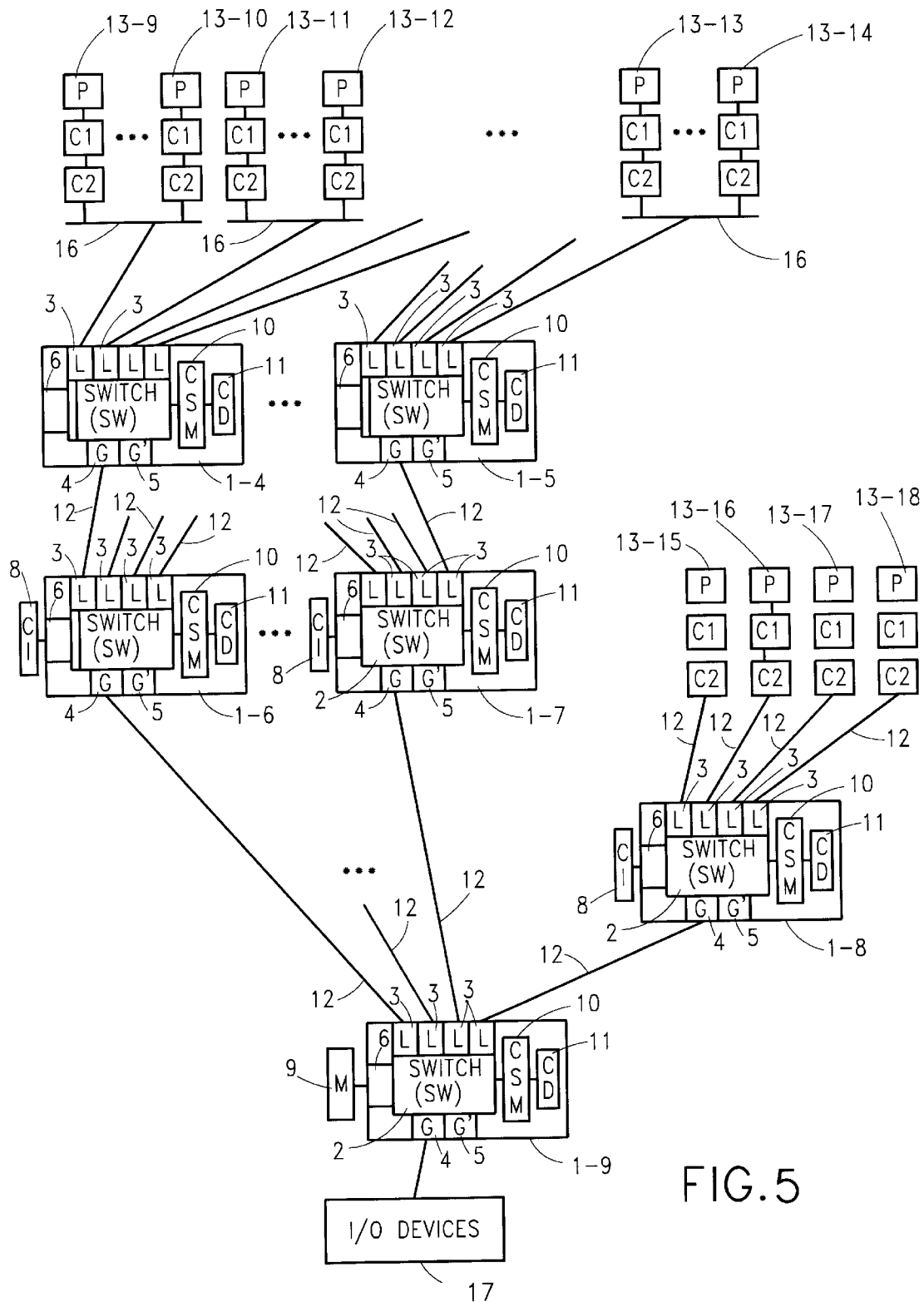
FIG. 5 shows another embodiment of a system according to the present invention having a hierarchical tree configuration.

Example topologies using this interconnect are shown in FIG. 5, FIG. 6, FIG. 7, and FIG. 8. FIG. 5 shows a multi-level hierarchical tree topology where the interconnection between levels of interconnects 1-4 through 1-9 is configured as point to point links 12. In FIG. 5, the interconnects 1-4 through 1-9 are used to connect a number of processor modules 13-9 through 13-18 to a shared memory 9 and I/O devices 17. Each processor module consists of one processor (labelled "P") and its associated local caches (labelled "C1" and "C2"). The set of processor modules connected to each shared processor bus 16 is called a processor group. A processor group is connected to an interconnect port 3. Processor modules may be attached at lower levels in the interconnection tree as shown for processor modules 13-15 through 13-18.

In FIG. 5, the root interconnect 1-9 has attached memory 9 and I/O devices 17. The second level of interconnects 1-6, 1-7 and 1-8 has attached interconnect caches 8 and connects the root interconnect 1-9 with higher levels. The third level of interconnects 1-4 and 1-5 is shown without attached interconnect caches, although interconnect caches could be attached at this level as well. The interconnects 1-4 through 1-9 throughout the system share the functions and same general capabilities, so that the same component part or module can be used for realizing all the interconnects 1-4 through 1-9 in the system. Such a three level configuration with four local ports on each interconnect and four processors in each processor group may support up to 256 processors. When more interconnect levels are used, more processors can be supported.

As is noted in FIG. 5, the different ports on the interconnects may be used in different ways. Local ports of interconnect 1-8 are shown connected to single processor modules 13-15 through 13-18 using a single processor bus. Local ports of interconnect 1-4 are shown connected to multiple processor modules 13-9 through 13-12 through shared buses 16. As shown, Global ports of interconnects can be either connected to other interconnects or directly to I/O devices 17 or to processors if the interconnect is at the root of the interconnection tree. The memory port 6 may be used to attach an optional cache 8 or to connect memory 9 when the interconnect is the root of the interconnection tree.

Figure 6:
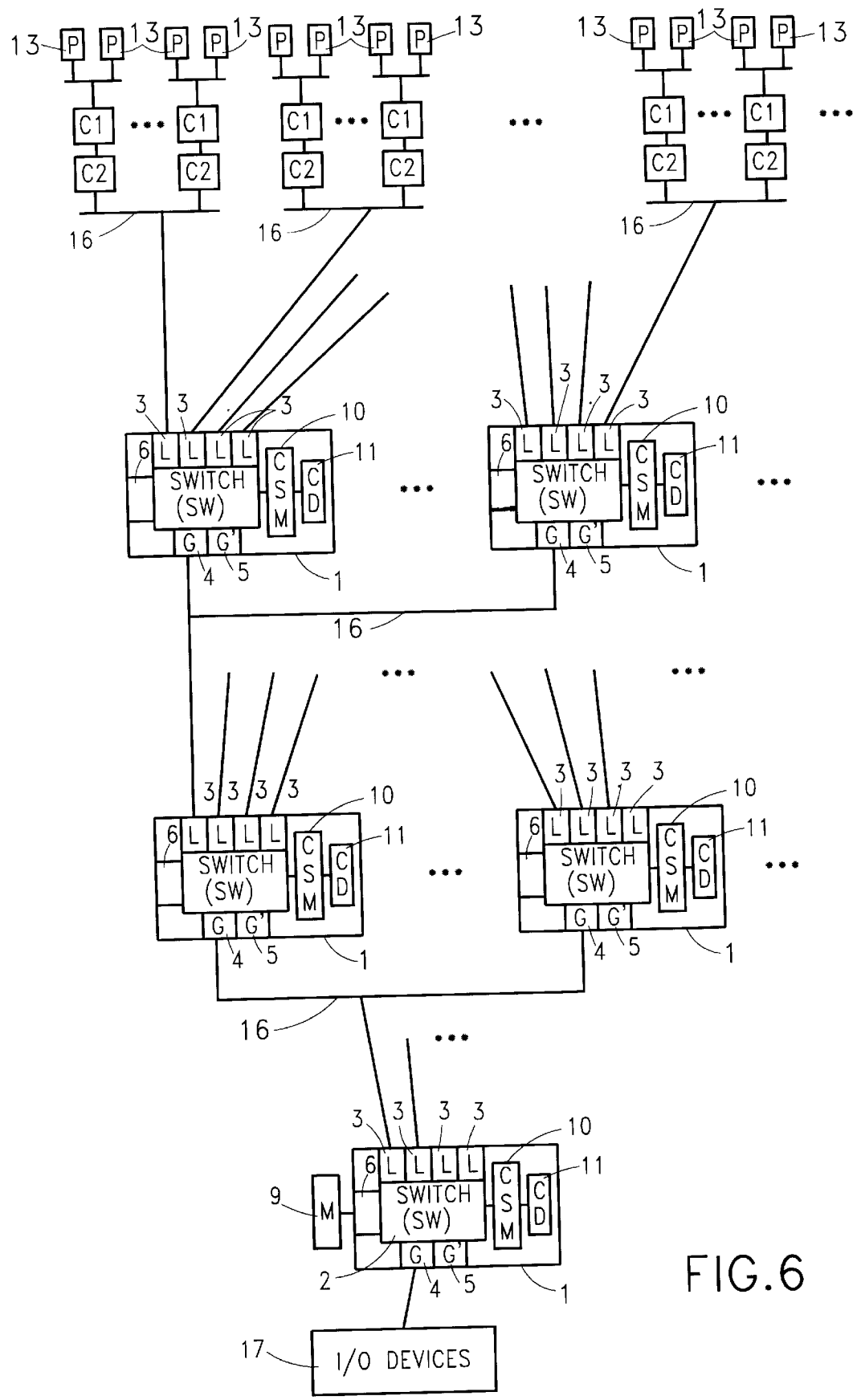
FIG. 6 shows another embodiment of a system according to the present invention having a hierarchical tree topology.

FIG. 6 shows a multi-level hierarchical tree topology where shared buses 16 are used to connect the different levels of interconnects. When shared buses 16 are used between the levels of the interconnects, the tree can support more processors for a given number of interconnection levels. FIG. 6 also shows the use of shared caches, where pairs of processors —are attached to each set of caches C1 and C2.

Figure 7:
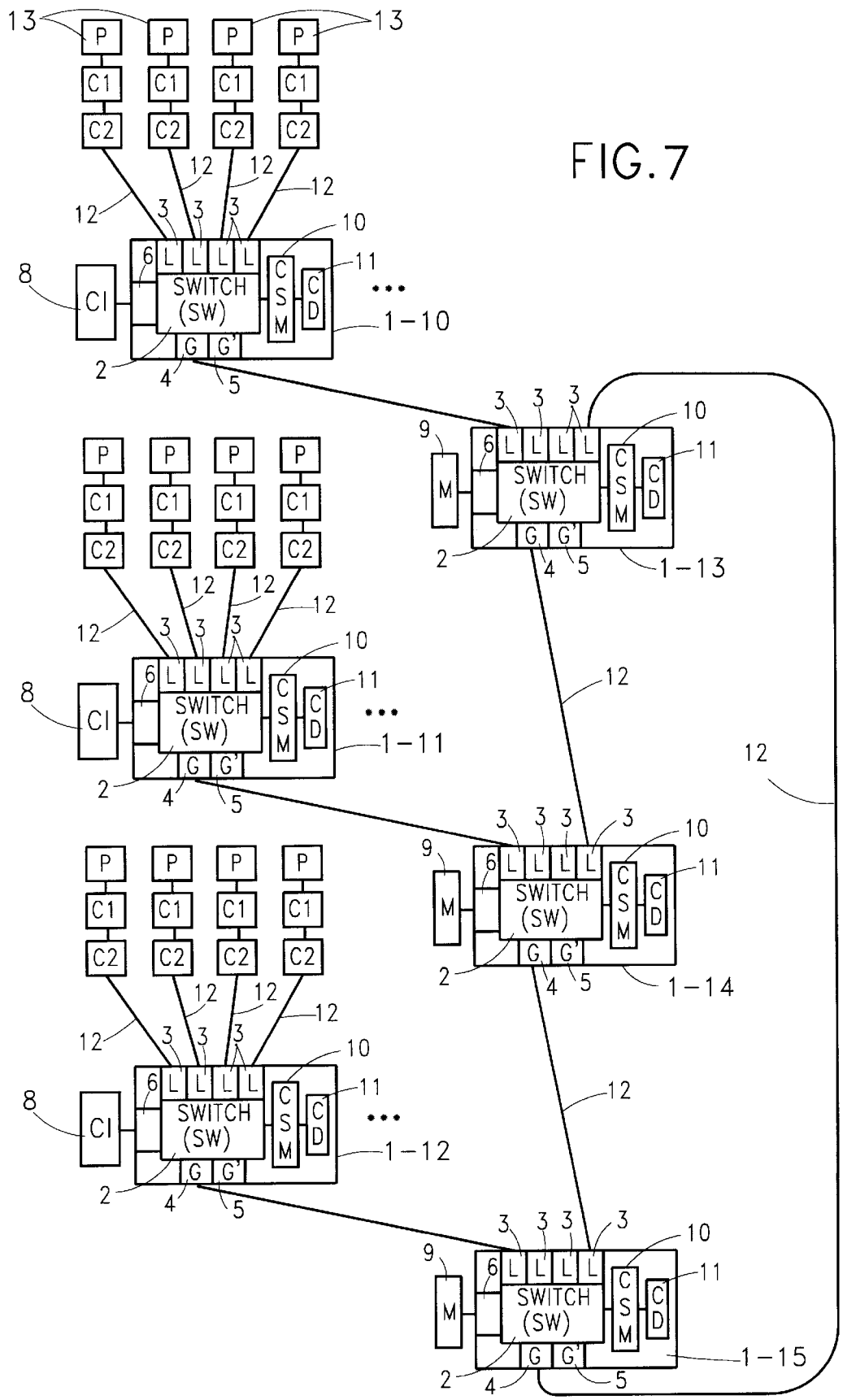
FIG. 7 shows another embodiment of a system according to the present invention having a ring of trees topology.

FIG. 7 shows a ring of trees topology where point to point links are used in the tree to connect interconnects 1-13, 1-14, and 1-15 with a single ring. Trees can exist above each of these interconnects 1-13, 1-14, and 1-15, that are in the ring. System memory 9 may either be attached to multiple interconnects in the ring as shown here, or may all be attached to a single interconnect in the ring.

Figure 8:
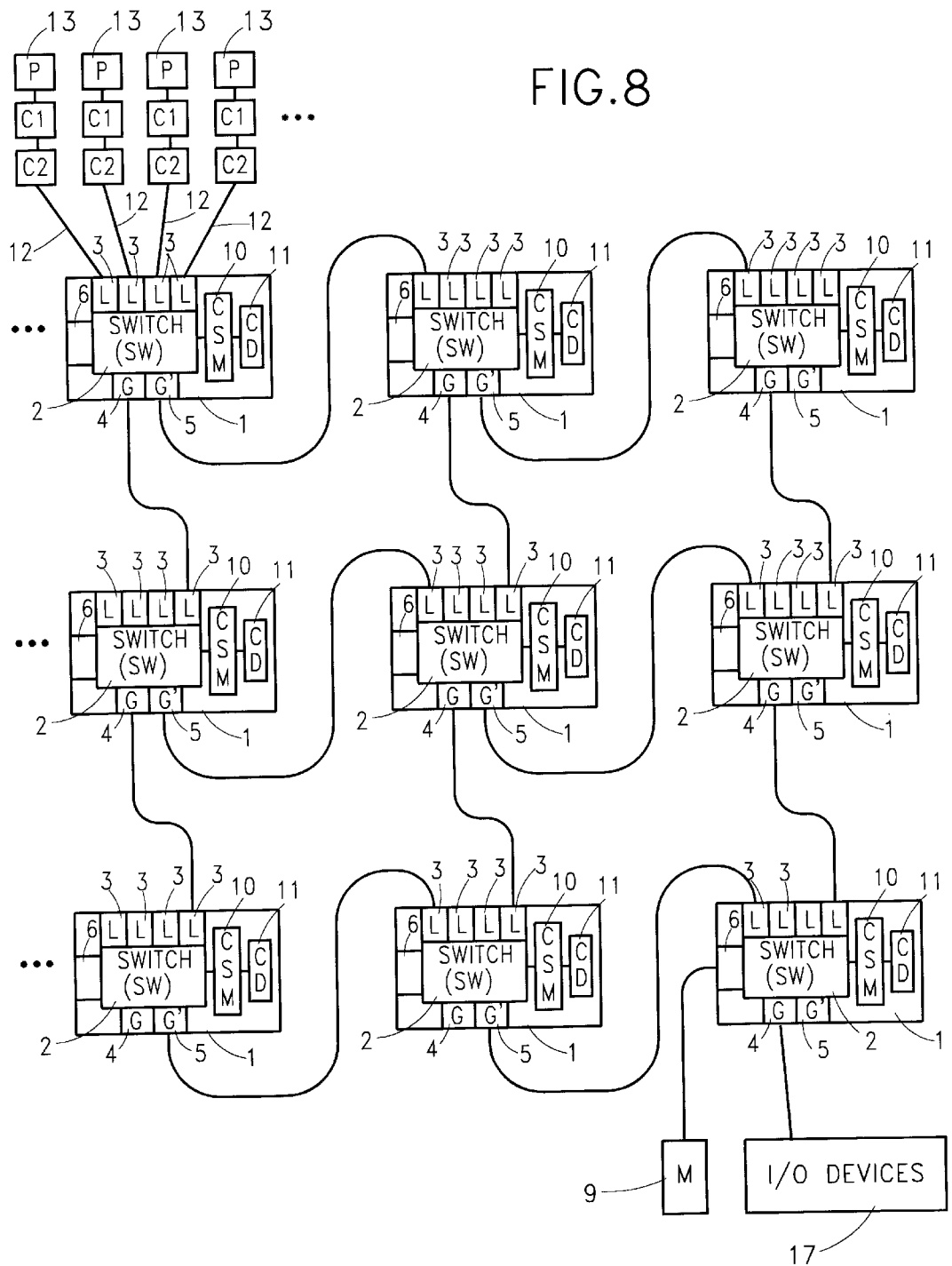
FIG. 8 shows another embodiment of a system according to the present invention having a two-dimensional mesh topology.

FIG. 8 shows a two dimensional mesh network, where longitudinal links and latitudinal links are used to connect the set of interconnects 1. For the two dimensional mesh network, processors may be attached to any interconnect 1 in the system. Increasing the numbers of local and global ports allows meshes with larger numbers of dimensions to be constructed, and more processors to be attached. Processors can either be attached to all of the interconnects of the mesh, or only attached to the edges of the mesh. System memory 9 and I/O devices 17 may either be located along edges in the mesh or connected to one interconnect at a corner of the mesh, as shown in FIG. 8.

As shown, a set of interconnects are used to connect processors to memory. The interconnects can be interconnected using any interconnection network topology that uses either point to point links or shared buses. FIG. 5, FIG. 6, FIG. 7, and FIG. 8, illustrate only a small set of the possible topologies that can be formed using the interconnects.

Now that a detailed description of the invention has been described, with alternatives, various improvements will become apparent to those of skill in the art. Thus, the detailed description is to be construed as an example rather than a limitation. The scope of the invention is properly defined by the appended claims.

What is claimed is:

1. In a computer system including a plurality of processors sharing information, the processors coupled by a plurality of interconnects to a memory such that the processors are not directly coupled to the same interconnect, a computerized method of maintaining cache coherency comprising the steps of:
  accessing and sharing, by a first processor and a second processor, information from the memory and setting path indicators in directories associated with at least two of the interconnects on a respective first and second access path to the memory, and storing the information in respective associated first and second caches; and
  writing a new value to the information, by a writing processor sharing the information, said writing step including:
    invalidating other copies of the information via the path indicators;
    acquiring exclusive access to the information by changing the path indicators to an exclusive state; and
    writing the new value to the information, in response to said acquiring step.

2. The method of claim 1, further comprising the steps of:
  accessing and sharing, by a third processor, the information from the memory and setting path indicators in a directory associated with a third access path to the memory; and
  storing the information in a third associated cache;
wherein said writing processor is the third processor.

3. The method of claim 1, wherein said acquiring exclusive access step executes at an interconnect on a path between the first processor and the second processor, and prior to completion of said invalidating step.

4. The method of claim 1, wherein each of the at least two of the interconnects is associated with a plurality of ports and wherein each of the directories is a coherency directory including a set of records, each record associated with a unit of information and including a single bit entry for each port, the method further comprising the step of setting the single bit entry to indicate that the unit of information can be reached via that port.

5. In a computer network including a plurality of processors coupled by a plurality of interconnects to a memory such that the processors are not directly coupled to the same interconnect, a computer system for maintaining cache coherency where the processors share information, said system comprising:
  first and second processor means for accessing and sharing information from the memory via a respective first and second access path to the memory, and storing the information in respective associated first and second caches; and
  at least two interconnects, each associated with:
    a plurality of ports;
    a coherency directory including a set of records, each record associated with a unit of the information, each record including an entry for each port indicating a status of the unit of information on that port; and
    a coherency state machine, coupled to the coherency directory, for setting path indicators in the coherency directory in response to an access request which traverses the interconnect, and for routing the information from the memory; the coherency state machine including logic for invalidating, in response to a processor request from one of the processors to write a new value to the information, other copies of the information via the path indicators and, acquiring exclusive access to the information by changing the path indicators to an exclusive state to enable the one of the processors to write the new value to the information.

6. The system of claim 5, further comprising:
  third processor means for accessing and sharing the information from the memory and storing the information in an associated third cache; and
  a third interconnect including a third coherency state machine for setting path indicators in the coherency directory associated with a third access path to the memory; wherein the third processor means communicates the processor request to write a new value to the information.

7. The system of claim 5 wherein the system topology is one of a hierarchical tree structure, a ring of trees, and an interconnection mesh.

8. The system of claim 5, wherein the processor means include one of an input/output (I/O) processor, an I/O bus, an I/O device and a vector processor.

9. The system of claim 5, wherein the entry associated with each port of the interconnect is a single bit for indicating whether data can be reached via that port.

10. The system of claim 5, wherein the interconnects are network routers.

11. The system of claim 5, wherein the interconnects are identical at different levels of a hierarchical structure.

12. The system of claim 5, wherein the interconnect is one of a tree of switches and a multi-level switch network.

13. The system of claim 5, wherein said logic executes within an interconnect on a path between the first processor means and the second processor means and wherein exclusive access is acquired prior to invalidation of all copies of the information via the path indicators.

14. The system of claim 5, further comprising an interconnect cache associated with each interconnect.

15. The system of claim 14, wherein, when an access request lacks associated entry in the coherency directory and wherein the requested information is not contained in the interconnect cache, the access request is routed to the network through one of a global port and an alternate global port.

16. The system of claim 14, wherein the interconnect cache may provide information in response to the access request.

17. In a computer network including a plurality of processors accessing and sharing information from a memory and storing the information in respective associated caches, the processors coupled by a plurality of interconnects to a memory such that the processors are not directly coupled to the same interconnect, an interconnect apparatus for maintaining cache coherency, comprising:

a plurality of ports;

a coherency directory including a set of records, each record associated with a unit of the information, each record including an entry for each port indicating a status of the unit of information on that port; and a coherency state machine, coupled to the coherency directory, for setting path indicators in the coherency directory in response to an access request which traverses the interconnect, and for routing the information from the memory; the coherency state machine including logic for invalidating, in response to a processor request from one of the processors to write a new value to the information, other copies of the information via the path indicators and acquiring exclusive access to the information by changing the path indicators to an exclusive state to enable the one of the processors to write the new value to the information.

18. The apparatus of claim 17 further comprising an interconnect cache associated with each interconnect.

19. The apparatus of claim 17, wherein said logic is coupled to an interconnect common to a first access path associated with a first processor sharing the information and a second access path associated with a second processor sharing the information.

20. The apparatus of claim 19, wherein said logic is adapted to enable a third processor to write the new value.

21. In a computer network including a plurality of processors accessing and sharing information from a memory and storing the information in respective associated caches, the processors coupled by a plurality of interconnects to a memory such that the processors are not directly coupled to the same interconnect, an interconnect apparatus for maintaining cache coherency, comprising:

a plurality of ports;

coherency directory means for indicating a status of the information on each port;

coherency state machine means, coupled to each coherency directory means, for setting path indicators in the coherency directory means, in response to an access request which traverses the interconnect, and for routing the information from the memory; the coherency state machine means including means for invalidating, in response to a processor request from one of the processors to write a new value to the information, other copies of the information via the path indicators and acquiring exclusive access to the information by changing the path indicators to an exclusive state to enable the one of the processors to write the new value to the information.

22. The apparatus of claim 21 further comprising an interconnect cache means associated with each interconnect.

* * * * *